Aug. 3, 1965    A. F. CHERNEY ETAL    3,198,159
HATCH COVER WITH INFLATABLE GASKET
Filed March 6, 1964    3 Sheets-Sheet 1
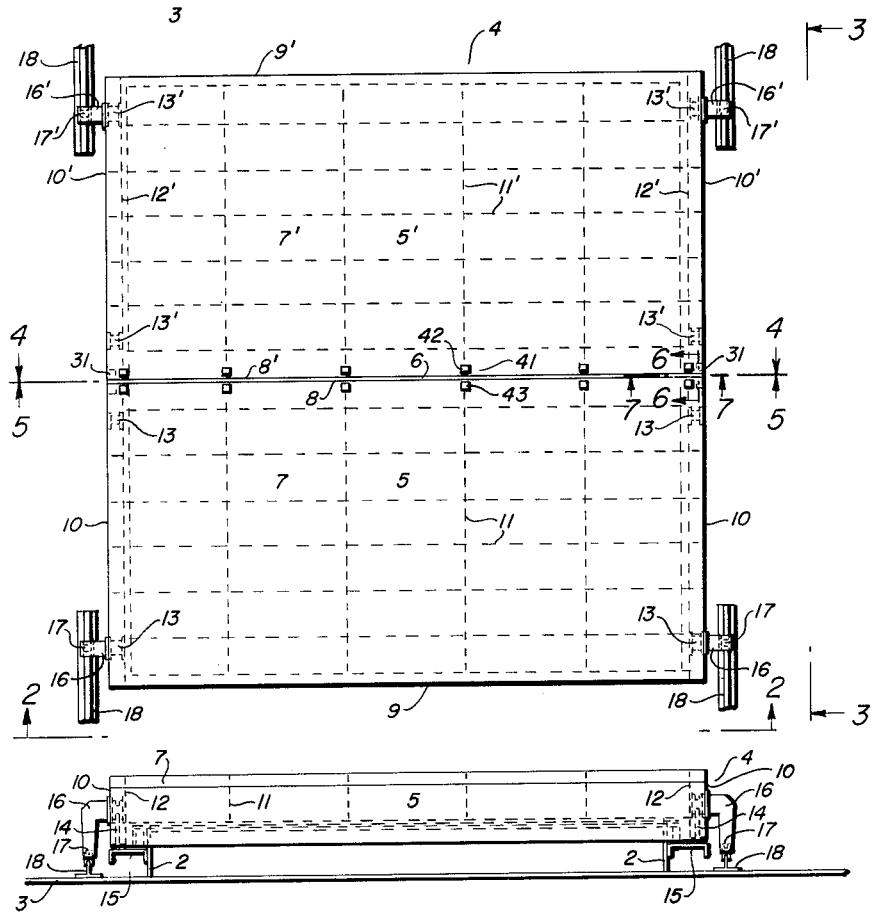
Fig. 1
Fig. 2
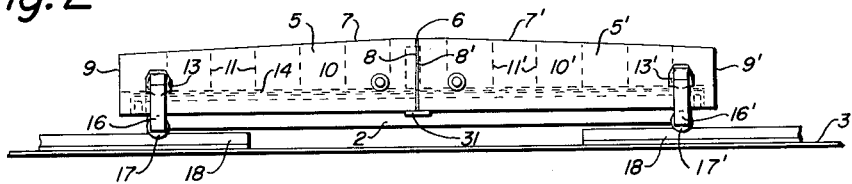
Fig. 3
INVENTORS
Alois F. Cherney
Herman A. Rohrs Aug. 3, 1965       A. F. CHERNEY ETAL       3,198,159
HATCH COVER WITH INFLATABLE GASKET
Filed March 6, 1964                3 Sheets-Sheet 2

INVENTORS
Alois F. Cherney
BY Herman A. Rohrs

INVENTORS
Alois F. Cherney
Herman A. Rohrs

United States Patent Office 3,198,159
Patented Aug. 3, 1965

3,198,159
HATCH COVER WITH INFLATABLE GASKET
Alois F. Cherney, Towson, and Herman A. Rohrs, Baltimore, Md., assignors, by mesne assignments, to Bethlehem Steel Corporation, a corporation of Delaware
Filed Mar. 6, 1964, Ser. No. 349,909
9 Claims. (Cl. 114—202)

This invention relates generally to a cover for closing a hatch opening, and specifically to an improved, inflatable-gasket type hatch cover for ships, which hatch cover can be operated so as to quickly close and tightly seal a hatch opening, and which can also be quickly unsealed and opened.

Cargo-carrying ships are generally constructed with a top deck, called a "weather" deck, provided with several hatch openings through which cargo can be introduced into, or removed from, the holds of the ship. The hatch openings are open only when the ship is in port and cargo is being loaded or unloaded. At other times, the hatch openings are kept closed and sealed tight. The importance of a tightly and securely sealed hatch opening in the weather deck of a vessel at sea is obvious. The custom formerly had been to place beams across the hatch opening and to cover these beams with planks and tarpaulin or other suitable material. This method required considerable time and labor and, on a large ship, several hours might have ben required to close and seal a single hatch opening. The maintenance of a large, modern vessel in port is very costly, and a simple application of elementary principles of economics soon dictated the development of improved methods and apparatus to reduce the time required to open and close a hatch opening, thereby to reduce the time required to load or unload a ship. Further developments in hatch covers produced almost an endless variety of rolling and folding covers, constructed in one piece or as several articulated panels, some with hydraulic mechanisms to open and close the covers, all with gaskets secured to the covers and adapted to engage some part of the ship structure to seal the hatch opening, and all with sundry jacks and ramps, operating individually or simultaneously, to raise and lower the hatch cover wheels present at the free unhinged edges of folding covers or at the four corners of rolling covers. Such jacks or ramps permitted the wheels to hang free when the cover was closed, thereby to permit dogging means around the perimeter of the cover to be actuated to compress the gasket and make the seal. In some of these covers, there was always a slight "drag" on the gasket just before the cover was closed and just after the cover was opened, which "drag" abraded the gasket and materially shortened the useful life thereof, despite attempts to lubricate the gasket. Moreover, in some applications of these prior art covers, the gasket was exposed to abuse in the cargo-handling operation, or to the abrading effects of the cargo itself, particular reference being made to ships carrying ore in bulk, all of which in time destroyed the efficiency of the gasket seal. It is interesting to note that, in these prior art covers, provision had to be made to prevent overcompression of the gasket which would destroy the same, such provision usually being in the form of stop plates which exposed only a small portion of the gasket and which carried the entire weight of the hatch cover beyond a predetermined maximum gasket compression; further, in some of these prior art covers, the forces required to break the gasket seal after the cover had been dogged down for some time were of such magnitude as to damage the gasket itself. The jacks and ramps were generally quite intricate in construction, were subject to the deleterious effects of a salt atmosphere, and required extensive servicing and maintenance; moreover, care had to be exercised in the operation of these jacks and ramps to avoid damaging the mechanisms operating the same or the cover itself.

The present invention overcomes all of the above-mentioned deficiencies of the prior art covers, and provides an eminently satisfactory cover for quickly and tightly sealing a hatch opening, and which can be quickly unsealed and opened. Very briefly, in the preferred embodiment in a rolling cover, an inflatable gasket is mounted adjacent the lower interior edge of the cover in an upright U-shaped channel, which gasket is inflated and expanded upwardly to sealing engagement with the underside of an outwardly extending flange on the hatch coaming, which cover eliminates the prior art jacks and ramps, and most of the prior art dogs as well as the gasket "drag" heretofore encountered.

One of the objects of this invention is to provide a hatch cover which may be quickly closed and tightly sealed over the hatch opening, and which may be quickly unsealed and opened.

Another object of this invention is to provide a hatch cover which eliminates gasket "drag" or rubbing in the opening and closing operations.

A further object of this invention is to provide a hatch cover wherein the gasket seal is protected from the direct force of waves.

Yet another object of this invention is to provide a hatch cover wherein the gasket is protected from abuse in the cargo handling operation, as well as from the abrading effects of certain bulk cargos as ores.

Still a further object of this invention is to provide a hatch cover which eliminates the jacks and ramps of the prior art covers, as well as most of the dogs.

Another object of this invention is to provide a hatch cover having an improved inflatable gasket.

Yet a further object of this invention is to provide a hatch cover having an effective means for continuing the seal from the sides of the cover across the parting joint edges.

Still another object of this invention is to provide a hatch cover constructed of two separate panels adapted to meet at a parting joint, with means to limit the inward travel of both panels in closing the hatch opening, said means also effecting the continuity of the seal from the sides of the panels across the parting joint.

Other and further objects of this invention will become apparent during the course of the following description and by reference to the accompanying drawings.

Referring now to the drawings, in which like numerals represent like parts in the several views:

FIGURE 1 represents a view in plan of the hatch cover in closed position over the hatch opening.

FIGURE 2 represents a view in elevation taken along the line 2—2 of FIGURE 1.

FIGURE 3 represents a view in elevation taken along the line 3—3 of FIGURE 1.

Figure 4:
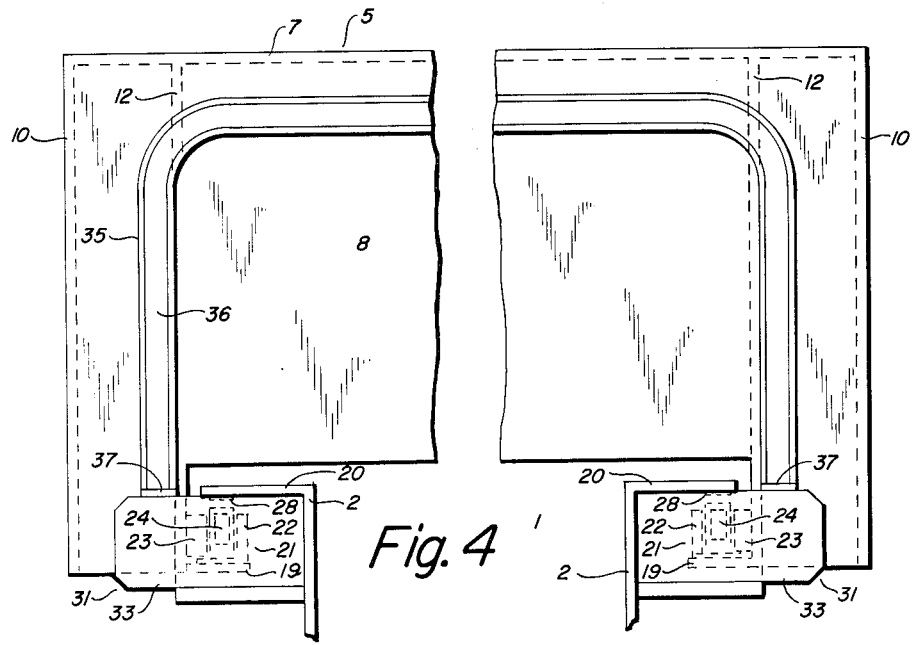
FIGURE 4 represents an enlarged, partially broken view in elevation taken along the line 4—4 of FIGURE 1, showing the parting joint edge of one of the cover panels, as well as the sealing stop.

In the preferred embodiment shown, hatch opening 1 having hatch coaming 2 upstanding from the deck 3 of the vessel, is closed by hatch cover 4 comprising panels 5 and 5' adapted to meet along a parting joint 6 at the center of the hatch opening 1.

Panels 5 and 5' comprise, respectively, top plating 7 and 7', parting joint end plating 8 and 8', end plating 9 and 9', side plating 10 and 10', and stiffeners 11 and 11' as shown. Internal vertical plating 12 and 12' is spaced inwardly from side plating 10 and 10', and wheels 13 and 13' are rotatably mounted therebetween adjacent the four corners of panels 5 and 5' for rolling movement on rails 14 supported on coaming flanges 15 suitably secured to the said hatch coaming 2. Additionally to support those ends of panels 5 and 5' remote from the parting joint when the hatch opening 1 is uncovered, adjacent those wheels 13 and 13' remote from the said parting joint 6, legs 16 and 16' are secured to the said panels 5 and 5', the lower ends of said legs 16 and 16' rotatably mounting wheels 17 and 17' for rolling movement on rails 18.

Figure 7:
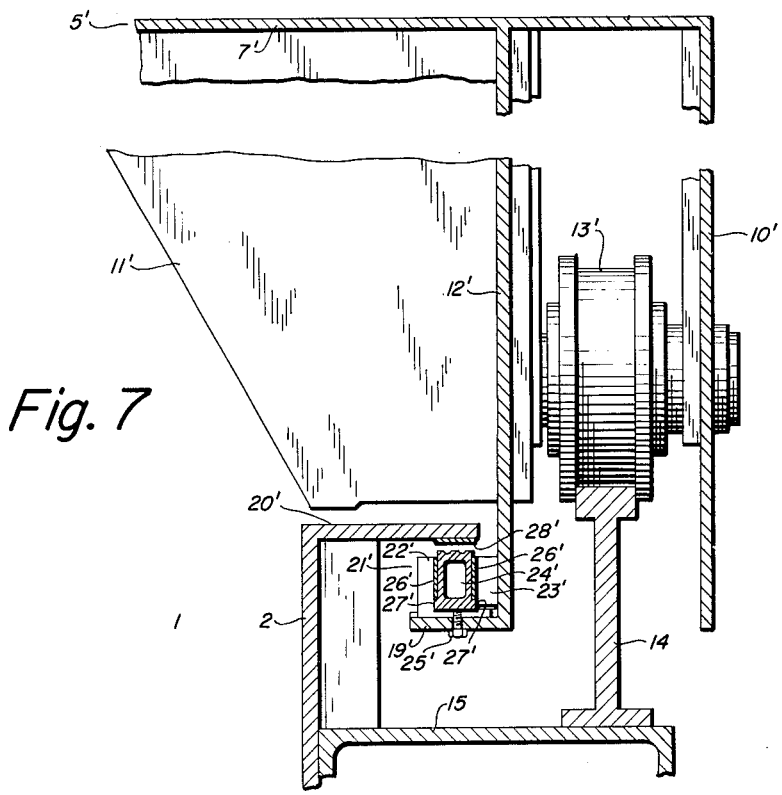
FIGURE 7 represents an enlarged, partially broken section in elevation taken along the line 7—7 of FIGURE 1, showing in detail the inflatable gasket and its relation to the hatch cover and hatch coaming.
Figure 6:
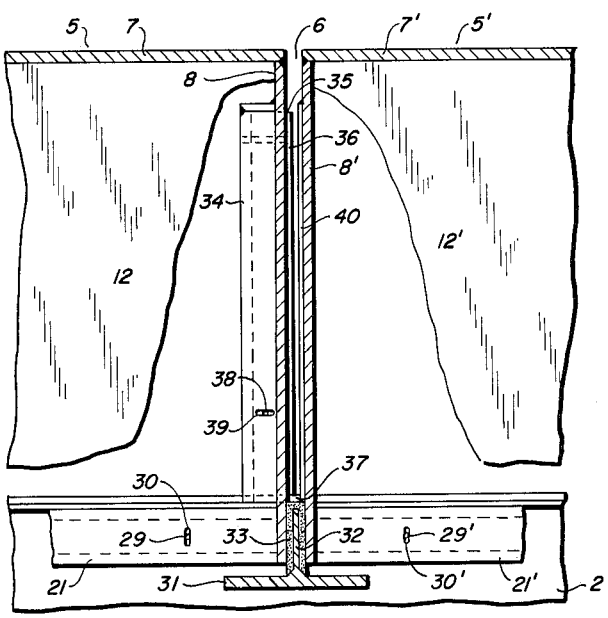
FIGURE 6 represents an enlarged section in elevation of the cover panels at the parting joint, showing the sealing stop, taken along the line 6—6 of FIGURE 1, with the internal side plating broken away.

Flanges 19 and 19' are provided at the lower extremities of internal vertical plating 12 and 12' and end plating 9 and 9', said flanges 19 and 19' extending horizontally inwardly and underlying, in vertically spaced relation, horizontal outwardly extending flanges 20 and 20' provided at the upper extremity of hatch coaming 2. U-shaped channels 21 and 21', comprising elements 22 and 22', 23 and 23', welded to flanges 19 and 19', and to internal vertical plating 12 and 12' as shown in detail in FIGURE 7, house inflatable gaskets 24 and 24' therein, the said gaskets 24 and 24' being adjustable in vertical position therein by means of screws 25 and 25' and suitable shims (not shown) below the said gaskets 24 and 24', retaining plates 26 and 26' being placed between the said gaskets 24 and 24' and elements 22 and 22', 23 and 23' to engage projections 27 and 27' at the bases of said gaskets 24 and 24' thereby to hold the latter in place, the said plates 26 and 26' being suitably secured in position. Above the said gaskets 24 and 24', sealing strips 28 and 28' are secured to the undersides of flanges 20 and 20'. Thus, when gaskets 24 and 24' are inflated through suitable air valves 29 and 29' accessible through openings 30 and 30' extending through one side of U-shaped channels 21 and 21', and through internal vertical plating 12 and 12', the said gaskets 24 and 24' will expand upwardly to sealingly engage the said sealing strips 28 and 28'. The ends of U-shaped channels 21 and 21' meet their respective parting joint end plating 8 and 8', thereby retaining the ends of said gaskets 24 and 24'. Gaskets 24 and 24' are also deflated through their respective air valves 29 and 29'.

Sealing stops 31, in the shape of an inverted T are secured in suitable manner to hatch coaming 2 outside hatch opening 1 at positions corresponding to the opposite ends of parting joint 6. The vertical legs 32 of said sealing stops 31 are covered with sleeves 33 of sealing material, preferably neoprene, and are adapted to engage parting joint end plating 8 and 8' when panels 5 and 5' are closed to meet at the parting joint 6, the said sealing stops 31 providing part of the seal at the parting joint 6 as well as positively limiting the inward movement of each of panels 5 and 5' as they are rolled over the hatch opening 1 to close the same.

U-shaped channel 34, similar in construction to U-shaped channels 21 and 21', is secured to the interior or rear surface of parting joint end plating 8, i.e., inside panel 5, and extends from an elevation adjacent the elevation of the tops of the vertical legs 32 of the sealing stops 31 up both sides of parting joint end plating 8 and across the upper edge thereof, stiffeners 11 being cut away where required, said U-shaped channel 34 facing parting joint end plating 8' of the opposite panel 5' through registering opening 35. Inflatable gasket 36 is mounted in said U-shaped channel 34 in the same manner as inflatable gaskets 24 and 24' are mounted in their respective U-shaped channels 21 and 21', said inflatable gasket 36 extending through opening 35. Plates 37, at the ends of inflatable gasket 36, are secured to U-shaped channel 34, and are adapted to extend over in contacting relation with the tops of sleeves 33 when panel 5 is closed. Inflatable gasket 36 is inflated and deflated through suitable air valve 38 accessible through opening 39 extending through one side of U-shaped channel 34.

Sealing strip 40, registering with inflatable gasket 36, is secured to the exterior surface of parting joint end plating 8' of panel 5'. Thus, sealing strip 40 extends from an elevation adjacent the elevation of the tops of vertical legs 32 of the sealing stops 31 up both sides of parting joint end plating 8' and across the upper edge thereof. It is apparent that proper clearance is provided between the two ends of sealing strip 40 and plates 37.

Figure 5:
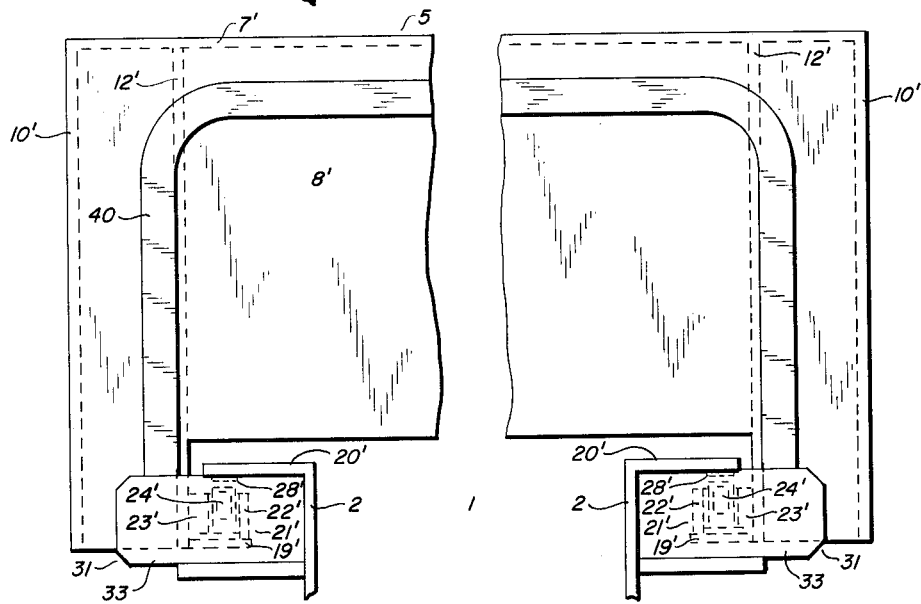
FIGURE 5 represents an enlarged, partially broken view in elevation taken along the line 5—5 of FIGURE 1, showing the parting joint edge of the other cover panel, as well as the sealing stop.

In describing the operation of the present invention, it will be assumed that hatch opening 1 is uncovered, panels 5 and 5' being drawn to either side thereof, and gaskets 24 and 24' and 36 are deflated. When it is desired to close the hatch opening, each panel 5 and 5' is rolled over its respective half of the hatch opening 1 to engagement with sealing stops 31. Gaskets 24, 24' and 36 are then inflated to engage their resepective sealing strips 28, 28' and 40; at the same time, conventional dogs 41 having elements 42 and 43 secured to panels 5 and 5', respectively, may be actuated to secure the said panels 5 and 5' to each other across parting joint 6. Hatch opening 1 is now securely and tightly sealed closed without the need for jacks or ramps for the wheels, and without peripheral dogs, the overlying relation of flanges 20 and 20' relative to flanges 19 and 19' respectively and the inflation of gaskets 28 and 28' serving to effectively maintain panels 5 and 5' in the proper vertical position relative to hatch opening 1, and the dogs 41 and sealing stops 31 serving to effectively maintain panels 5 and 5' in proper horizontal registry over the hatch opening 1. The major area of gasket seal lies between gaskets 24 and 24' and their respective sealing strips 28 and 28', and it will be noted that this area of gasket seal lies within the panels 5 and 5' and is thereby protected from direct exposure to the force of waves. Moreover, it will be noted, particularly from FIGURES 4 and 5, that sealing stops 31 bridge the gap between gaskets 24 and 36, and between gasket 24' and sealing strip 40.

When it is desired to uncover hatch opening 1, dogs 41 are released and gaskets 24, 24' and 36 are deflated through their respective air valves 29, 29' and 38. Panels 5 and 5' are then rolled to their respective ends of the hatch opening 1 to uncover the same. In this position, it will be observed, gaskets 24 and 24' are, by virtue of their positions inside their respective panels 5 and 5', amply protected from abuse during the cargo handling operation.

In all closing and uncovering operations, it will be noted that the main gaskets 24 and 24' (as well as the parting joint gasket 36) do not rub or "drag" as occurs in many prior art structures.

It will be obvious to those skilled in the art that various changes may be made without departing from the spirit of the invention, and therefore the invention is not limited to the exact structure herein shown and described, but includes other modifications, substitutions and equivalents as are embraced within the scope of the appended claims.

We claim:

1. Closure means for a hatch opening extending through a deck, comprising:
    (a) a vertical coaming extending along the perimeter of the hatch opening above the deck,
    (b) a first horizontal flange secured to said coaming above the deck and extending away from the hatch opening,
    (c) a hatch cover adapted to be placed over the hatch opening to close the same or selectively to be removed from the hatch opening to open the same,
    (d) a second horizontal flange on said hatch cover extending inwardly thereof beyond the outer edge of said first horizontal flange and adapted to underlie the first flange in vertically spaced relation when said hatch cover is placed over the hatch opening,
(e) gasket means interposed between said first and second flanges.

2. Apparatus as in claim 1, further including:
(f) the said gasket means being secured to the upper surface of said second flange,
(g) means to inflate said gasket means to expand the same upwardly into engagement with the bottom surface of said first flange or selectively to deflate said gasket means.

3. Closure means for a hatch opening extending through a deck, comprising:
(a) a vertical coaming extending along the perimeter of the hatch opening above the deck,
(b) a first horizontal flange secured to said coaming above the deck and extending away from the hatch opening,
(c) a hatch cover adapted to be reciprocated in a horizontal plane to a closed position over the hatch opening or selectively to an open position away from the hatch opening,
(d) a second horizontal flange on said hatch cover extending inwardly thereof, said second flange being adapted to pass under said first flange in vertically spaced relation thereto when said hatch cover is shifted over the hatch opening,
(e) gasket means interposed between said first and second flanges.

4. Apparatus as in claim 3, further including:
(f) the said gasket means being secured to the upper surface of said second flange,
(g) means to inflate said gasket means to expand the same upwardly into engagement with the bottom surface of said first flange or selectively to deflate said gasket means.

5. Closure means for a hatch opening extending through a deck, comprising:
(a) a vertical coaming extending along the perimeter of the hatch opening above the deck,
(b) a first horizontal flange secured to said coaming above the deck and extending away from the hatch opening,
(c) a hatch cover comprising first and second panels adapted to be reciprocated in a horizontal plane towards each other to meet at a parting joint along the center of the hatch opening to close the same or selectively away from each other to their respective ends of the hatch opening to open the same,
(d) a second horizontal flange on each of the panels extending inwardly thereof and adapted to pass under said first flange in vertically spaced relation thereto when the panels are shifted over the hatch opening,
(e) gasket means interposed between said first and second flanges.

6. Apparatus as in claim 5, further including:
(f) sealing stop means secured to said coaming adjacent the parting joint and extending into the parting joint, said sealing stop means being adapted to engage the advancing ends of said panels when the latter are shifted to close their respective portions of the hatch opening thereby to restrain the panels from further movement in the same direction, said sealing stop means being further adapted to provide at least some seal between the panels and the hatch opening.

7. Apparatus as in claim 5, further including:
(f) the said gasket means being secured to the upper surface of said second flanges within the said panels,
(g) means to inflate said gasket means to expand the same upwardly into engagement with the bottom surface of said first flange or selectively to deflate said gasket means.

8. Apparatus as in claim 7, further including:
(h) second inflatable gasket means secured to one of said panels along the edge thereof that faces the parting joint,
(i) additional means to inflate said gasket means to expand the same laterally to engagement with the other panel along the edge thereof that faces the parting joint.

9. Apparatus as in claim 8, further including:
(j) sealing stop means secured to said coaming adjacent the parting joint and extending into the parting joint, said sealing stop means being adapted to engage the advancing ends of said panels when the latter are shifted to close their respective portions of the hatch opening thereby to restrain the panels from further movement in the same direction, said sealing means being further adapted to cooperate with said inflatable gasket means and said second inflatable gasket means to seal the panels to the hatch coaming and across the parting joint.

References Cited by the Examiner

UNITED STATES PATENTS 2,360,276  10/44  Redmond _____ 114—201

FOREIGN PATENTS 94,104  8/55  Norway.

MILTON BUCHLER, *Primary Examiner.*

ANDREW H. FARRELL, *Examiner.*